United States Patent [19]

Fukunaga et al.

[11] Patent Number: 5,237,384

[45] Date of Patent: Aug. 17, 1993

[54] LASER POSITIONER AND MARKING METHOD USING THE SAME

[75] Inventors: Nobuyuki Fukunaga, Toyama; Mutsuhiko Kimura, Aichi; Yasuo Metoki, Ushiku; Takeo Saito, Tokyo; Yoshiaki Ishida, Chichibu; Kenji Miyahara, Ichikawa, all of Japan

[73] Assignees: Sato Kogyo Co., Ltd., Toyama; Mac Co., Ltd., Chiba, both of Japan

[21] Appl. No.: 726,179

[22] Filed: Jul. 5, 1991

[30] Foreign Application Priority Data

Jul. 5, 1990 [JP] Japan ................... 2-176335

[51] Int. Cl.$^5$ .................... G01B 11/26; G01B 11/24; G01C 3/08; E21C 1/00
[52] U.S. Cl. ......................... 356/141; 356/5; 356/376; 356/393; 299/1.05
[58] Field of Search ............ 356/393, 1, 4, 5, 141, 356/152, 376, 375; 299/1.05

[56] References Cited

U.S. PATENT DOCUMENTS

| | | | |
|---|---|---|---|
| 3,809,477 | 5/1974 | Russell | 356/152 |
| 4,355,895 | 10/1982 | Cairns et al. | 356/152 |
| 4,688,937 | 8/1987 | Konig et al. | 299/1.05 |
| 4,708,395 | 11/1987 | Petry et al. | 299/1.05 |

*Primary Examiner*—Stephen C. Buczinski
*Attorney, Agent, or Firm*—Wenderoth, Lind & Ponack

[57] ABSTRACT

A laser positioner is located at a survey base point for projecting a geodetic design pattern depicting design working points onto a working face remote from the base point by use of a laser pattern projector, upon surveying an object route by use of a laser surveying unit. In tunneling operations for example, the design pattern is formed on the working face, so that boring of the holes for charging explosives in the working face can be performed without paint-marking on the working face.

11 Claims, 3 Drawing Sheets

LASER POSITIONER AND MARKING METHOD USING THE SAME

BACKGROUND OF THE INVENTION

1. Field of the Invention

This invention relates to a laser positioner for automatically measuring geodetically specified points and optically forming a geodetic pattern on a working face in construction projects, tunneling projects or the like by use of surveying laser instruments, and a method for optically marking boring points on a working face of a tunnel in a tunneling project by use of the laser positioner.

2. Description of the Prior Art

It is a prerequisite to make an elaborate survey and precisely mark on a working face in order to determine the surveying reference points necessary for carrying out various construction projects such as road and tunneling works. Though the surveying was onerous and troublesome in the past, the accuracy of surveying for road, tunneling, and building construction and the like has been significantly improved and the operational efficiency of surveying has been significantly advanced by use of laser surveying instruments. The laser instruments using a visible ray have been advantageously applied to the tunneling projects carried out in dark places.

As one example, the work of marking points at which explosive charging holes are to be bored in a working face of the tunnel cannot be automated even now, and has such work thus far been carried out manually. In the tunneling operation (e.g. New Austrian Tunneling Method: NATM; patented to L. V. Rabcewicz), the hard base rock of the working face is often blasted with explosives. Therefore, the holes for charging the explosives are previously bored in the working face at the geodetically specified points predetermined in accordance with designs of construction which are strictly made in advance. Although the specified points at which the explosive charging holes are bored in the working face of the tunnel can be designed automatically with ease by use of a computer, the work of marking at the design points for boring the explosive charging holes has been manually carried out, and automation of marking on the working face in the tunneling construction cannot yet be accomplished.

It would be possible to utilize a computer and a laser system in marking the points on the working face of the tunnel. That is, the boring points at which explosive charging holes are to be bored in the working face can be predetermined by use of the computer. Then, while directing a laser spot corresponding to one of the predetermined boring points onto the working face by use of a laser oscillator under the control of the computer, the position at which the laser spot representing the predetermined boring point is formed on the working face of the tunnel is manually marked with paint. The manual marking with paint is successively continued for other boring points in order, but turns out to be a very troublesome chore.

SUMMARY OF THE INVENTION

This invention was made in consideration of the aforenoted drawbacks of the conventional laser marking method. Its object is to provide a laser positioner capable of automatically effecting measurement of surveying points, arithmetic processing for determining design points, and optical formation of a visible pattern corresponding to the design points on an object face.

Another object of this invention is to provide a marking method using the aforesaid laser positioner, by which specific points designed on the basis of the measured surveying points can be concurrently formed automatically in the form of a visible pattern on the object face by use of a laser pattern projector, so that the designed specific points can be optically marked effectively.

Still another object of this invention is to provide a laser positioner capable of measuring the surveying points and forming the designed specific points in the form of a visible pattern on the object face such as a working face of a tunnel which can be remotely controlled to improve the workability of the marking procedure.

To attain the objects mentioned above according to this invention, there is provided a laser positioner comprising a laser surveying unit for effecting distance and angular measurements, a control system for determining design points based on surveying data of the distance and angular measurements outputted from the laser surveying unit and controlling the laser surveying unit in measuring, and a laser pattern projector for forming a pattern representing the design points on an object face under the control of the control system.

The laser surveying unit has a laser oscillator for directing a laser spot toward reference targets so that distances and angles of the laser surveying unit relative to the respective reference targets can be measured by receiving reflected rays from the reference targets. The laser surveying unit and laser pattern projector may be united and controlled through wireless control means remote from the surveying basic point at which the laser surveying unit and laser pattern projector are positioned.

The marking method using the aforementioned laser positioner according to the present invention comprises previously determining design points for each survey location on a geodetic route, measuring surveying reference points and the absolute position of an object face to be marked on the basis of the reference points by use of the laser surveying unit to obtain the coordinates of the reference points and absolute position of the object face, and projecting a laser beam from the laser pattern projector while deflecting the laser beam so as to form a laser pattern representing the design specific points predetermined on the survey location corresponding to the obtained coordinates of the absolute position of the objective face.

When the object face is the working face of a tunnel, the points to be bored for charging explosives can be depicted by projecting the design specific points in the form of a laser pattern on the working face. Thus, while projecting the design specific points on the working face, explosive charging holes can be directly bored on the working face without paint-marking.

BRIEF DESCRIPTION OF THE DRAWINGS

The other objects and features of the present invention will be hereinafter explained in detail with reference to the accompanying drawings, wherein.

DESCRIPTION OF THE PREFERRED EMBODIMENT

Figure 1:
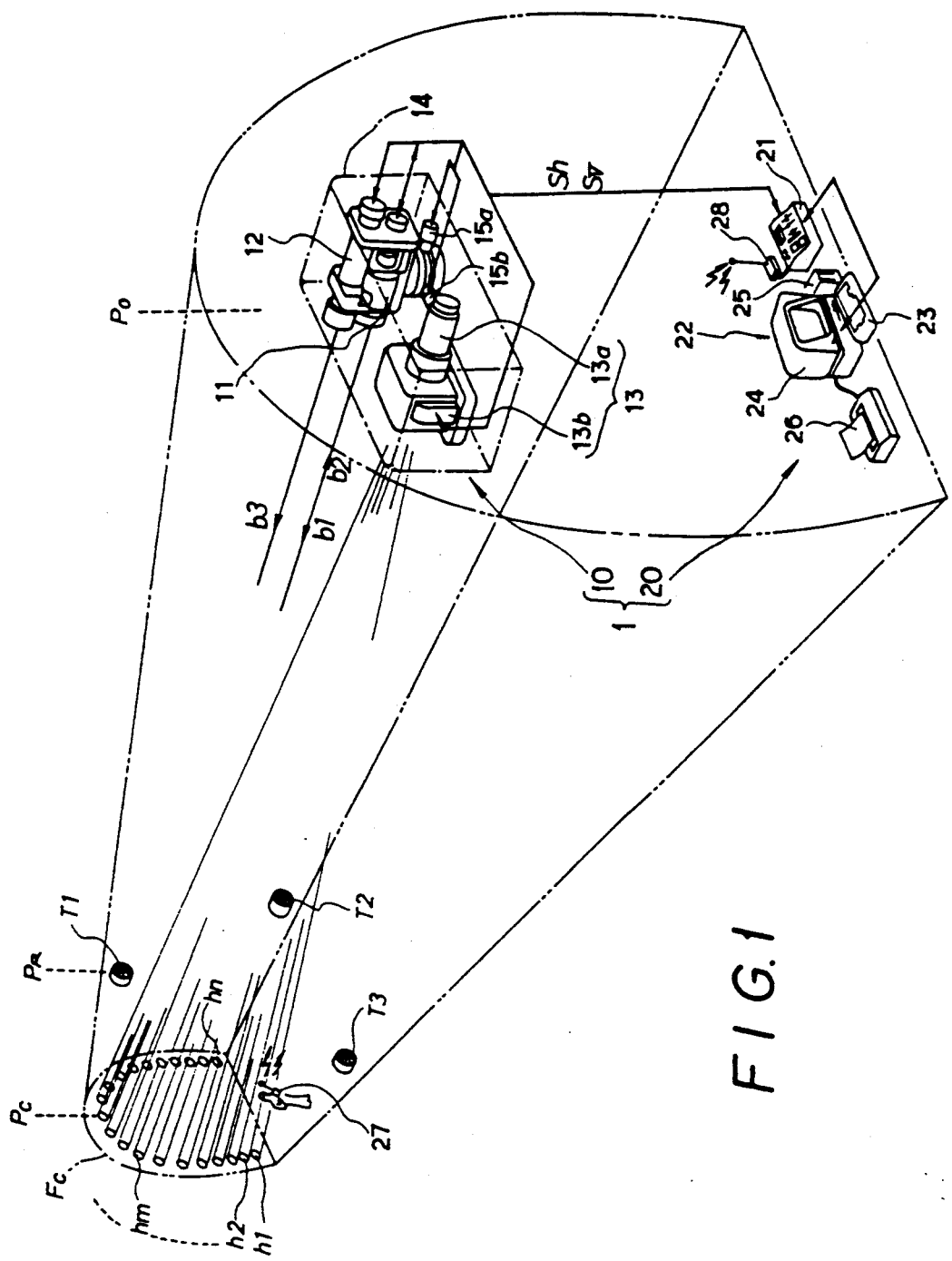
FIG. 1 is a schematic diagram showing one embodiment of the laser positioner according to this invention, which is applied to a tunneling operation.

A laser positioner 1 of this invention for use in a construction operation for excavating a tunnel is illustrated in FIG. 1. The laser positioner 1 includes an operation system 10 which is located at a basic point Po remote from an object face Fc to be marked, and a control system 20 for controlling the operation system 10. In this case, the object face Fc is a working or pit face of the tunnel.

The operation system 10 comprises a laser surveying unit 11 such as a so-called "laser theodolite" or "total station" which directs a laser beam b1 toward a reflector target and receives a reflected beam b2 from the target so as to measure the distance and angle of the target relative to the basic point Po, a laser beam generator 12 capable of issuing a laser beam b3 in parallel to the laser beam b1 issued from the laser surveying unit 11, and a laser pattern projector 13 including a high output laser oscillator 13a and laser deflecting means 13b.

In this embodiment, the aforenoted laser surveying unit 11 and laser pattern projector 13 are together retained within a portable casing 14, but may be separated from each other if the relative positions of the laser surveying unit 11 and the laser pattern projector 13 can be realized.

The laser surveying unit 11 may be constituted by combining a laser range finder and a goniometer. The laser beam generator 12 for issuing a laser beam to form a single laser spot on the object face is secured integrally with the laser surveying unit 11, but is not absolutely necessary to this invention. As the laser pattern projector 13, there may be used a common laser image display system capable of forming an image pattern by projecting and deflecting a laser beam outputted from a laser oscillator.

The united laser surveying unit 11 and laser beam generator 12 are retained on a universal positioning means composed of a horizontal rotation motor 15a and a vertical rotation motor 15b so that the laser beam b1 and b3 issued from them can be directed in substantially all directions.

The control system 20 includes a control console 21 for controlling the operations of the laser surveying unit 11, the laser pattern projector 13 and other driving elements in accordance with command signals and predetermined control parameters, and an arithmetic control unit 22 to which the command signals and control parameters are input manually. The arithmetic control unit 22 is connected to the laser surveying unit 11, laser beam generator 12 and laser pattern projector 13 through the control console 21 so as to process surveying data fed from the laser surveying unit 11 and output automatic control signals to the laser surveying unit 11, laser beam generator 12 and laser pattern projector 13.

The arithmetic control unit 22 has, for example, a data input means such as a keyboard 23, a display means 24 such as a CRT, and a memory unit 25 for storing various data. As the control unit 22, there may be used a general purpose computer, preferably, a handheld computer. Of course, a printer 26 may be utilized.

The control system 20 further has a wireless control system composed of a wireless transmitter hand unit 27 for transmitting control command signals, and a wireless receiver unit 28 connected to the control console 21. With this wireless control system, the laser surveying unit 11, laser beam generator 12 and laser pattern projector 13 can be controlled from a remote place.

Next, a method for marking points for boring explosive charging holes in the working face of a tunnel under construction by use of the laser positioner according to this invention will be explained with reference to generalized diagrams shown in FIGS. 2(A) and 2(B) and a flow chart of FIG. 3. Although this invention is described here as being applied in the marking of points for boring holes in the tunneling operation as one embodiment of this invention, it is applicable to other construction and industrial fields.

Prior to execution of the tunneling operation, a geological survey and a soil analysis are performed for preparing, planning and executing designs so as to determine the number and locations (coordinates: Xhm, Yhm, Zhm) [m=1 ... n] of explosive charging holes to be bored in the working face Fc at points along the design route of the desired tunnel. (Process I)

The coordinates of the designed points for the explosive charging holes can be determined by the angles of the directions of X-axis, Y-axis and Z-axis. The designed points are expressed by mathematics which is programmed in the arithmetic control unit 22. When boring the explosive charging holes in the working face, the design points for the boring holes are required to be marked on the working face Fc. First, in marking the boring points thus designed, the aforenoted laser positioner 1 of this invention is located at the basic point Po remote from the working face Fc confront the working face (marking surface). (Process II)

The basic point Po may be determined at any place in the tunnel, but it is defined by predetermined positional coordinates (Xo, Yo, Zo) realized previously by the aforesaid designing process. Also, the laser positioner 1 may be located anywhere in the cross section at the basic point Po, but it is preferably fixed on the crown portion of the tunnel by use of suspending means (not shown) to keep it out of the way in the tunnel. The control system 20, including the control console 21 and arithmetic control unit 22, is placed near the laser positioner 1, and the wireless receiver unit 28 is connected to the control console 21. In general, it is desirable to locate the laser positioner 1 about 50 meters away from the working face Fc, when the route in the tunnel is straight.

Next, at three reference points in a cross section (reference section surface) Fr which is arbitrarily determined in the tunnel, reflector targets T1, T2, T3 are located. (Process III)

The absolute coordinates (Xrk, Yrk, Zrk) [k=1, 2, 3] of the reference points at which the targets are located may be determined in advance in designing the tunnel, or can be determined in executing the operation by use of the laser surveying unit 11.

The reference center Pr of the reference section surface Fr is usually positioned about 40 meters from the basic point Po, when the route of the tunnel is straight. As the targets T1–T3, there may be used cubic corner prisms capable of reflecting incident light to a direction parallel to the incident light.

Then, the laser survey unit 11 is operated to direct the laser beam b1 to the respective reflector targets T1–T3 so as to precisely measure the distances from the unit 11 to the respective targets T1–T3 on the basis of the time difference between the laser beam b1 outputted therefrom and the reflected laser beam b2 returning from the targets T1–T3, and at the same time, find the angles at which the laser beam b1 is directed to the respective targets. From the survey data obtained from the measured distances and angles (X-axis deflection angle $\theta x$ and Y-axis deflection angle $\theta y$) relative to the respective targets, the relative position (absolute coordinates: Xo, Yo, Zo) of the laser positioner 1 to the targets can be determined with a high degree of accuracy. Further, the distance from the basic point Po to the working face (marking face) Fc is measured by directing the laser beam b1 from the laser survey unit 11 to a reflector prism disposed on the working face Fc for light wave measurement. Thus, the absolute coordinates of the working face Fc are obtained. (Process IV)

Upon measurement of the absolute positional coordinates of the laser positioner 1 and the working face Fc, the positional data (coordinates: Xhm, Yhm, Zhm [m=1 ... n]) predetermined in Process I noted above for determining the points at which the desired explosive charging holes are bored in the working face Fc are inputted to the arithmetic control unit 22 to perform mathematical computations and obtain control signals Sh, Sv for operating the laser pattern projector 13. (Process V)

With the control signals Sh, Sv from the control unit 22, the laser beam generator 12 may be operated to direct the laser beam b3 toward the working face Fc so as to form a single laser spot. Such single laser spots are formed one-by-one so as to optically indicate the points to be bored for explosive charging holes one-by-one. In this case, an operator positioned near the working face Fc can remotely control the laser beam generator 12 by means of the wireless control system including the transmitter hand unit 27.

Figure 2:
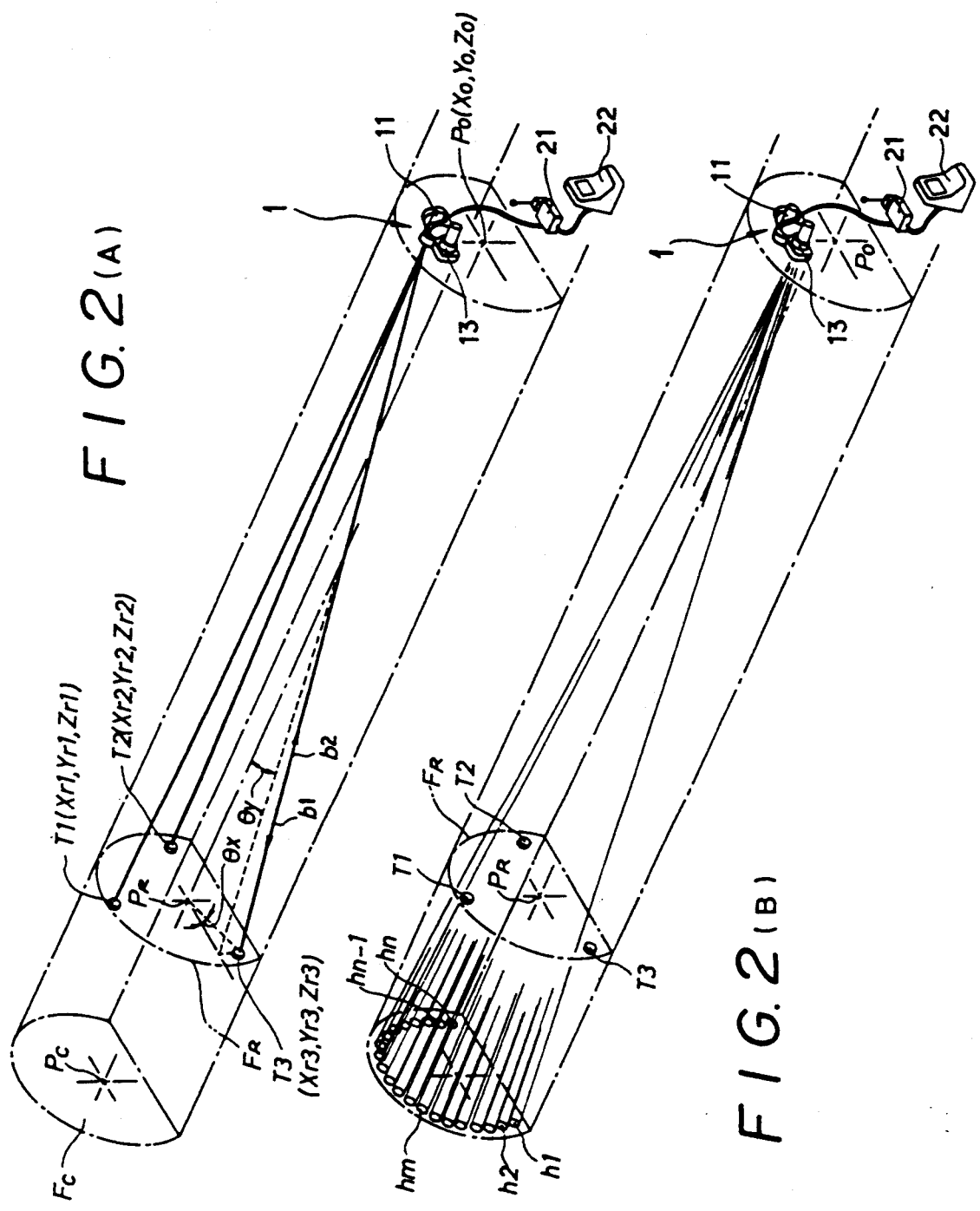
FIGS. 2(A) and 2(B) are explanatory diagrams showing the operating principle of the laser positioner of this invention.
Figure 3:
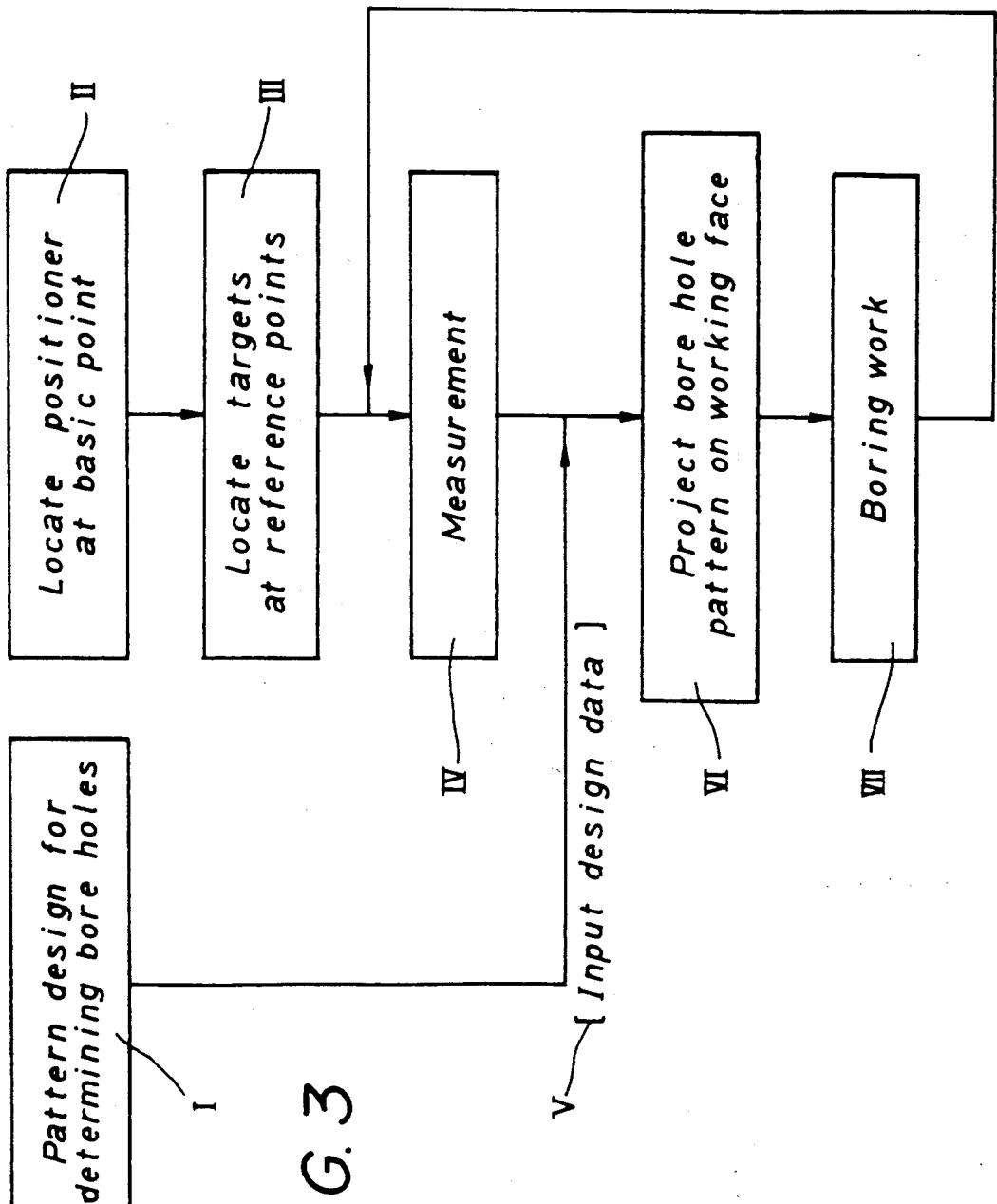
FIG. 3 is a flow chart of a procedure according to the invention for optically marking on an object face by use of the laser positioner of this invention.

By inputting the control signals Sh, Sv to the laser deflection means 13b of the laser pattern projector 13, the laser beam issued from the laser oscillator 13a can be horizontally and vertically deflected continuously to form a laser pattern indicating concurrently all the explosive charging holes hl..hm..hn on the working face Fc as illustrated in FIG. 2(B). (Process VI)

While projecting the laser pattern to optically mark the desired points on the working face, boring work is carried out to form the holes for charging the explosives in the working face, without paint-marking, for example. Upon completion of the boring of explosive charging holes in the working face, charging of explosives into the bored holes, blasting, mucking, and timbering are effected in order to drive forward the working face. (Process VII)

Thus, one cycle of the tunneling process is finished, and is repeated from the aforenoted Process IV in which the surveying for measuring the absolute position of the new working face is carried out.

If the new working face is too distant from the basic point Po, or cannot be viewed from the basic point Po due to a curved route, the laser positioner 1 is moved toward the working face. In this case, the marking work is carried out beginning at Process II described above.

The command data inputted to the arithmetic control unit 22 and the measured data obtained as a result of surveying with respect to the basic and reference points, the positional data of the working face and other necessary data can be concurrently displayed on the display means 24, outputted to the printer 26, and stored in the memory unit 25.

All control of the laser positioner 1 can be performed by the operator positioned near the working face by using the transmitter hand unit 27. In a tunneling explosion method such as the NATM method in which cut-holes are possibly formed in the working face, it is preferable to differentiate the cut-holes from the explosive charging holes by employing different marks than those used for the laser pattern formed on the working face. Thus, a mistakes in charging the explosives can be prevented.

As is clear from the above, this invention provides a laser positioner which is capable of automatically effecting measurement of surveying points, arithmetic processing for determining design points, and optical formation of a visible pattern depicting the design points on an object face. Besides, by using the laser positioner, geodetically specified points can be marked in the form of a visible pattern on the working face of a tunnel so as to facilitate boring operations. Furthermore, the measurement of surveying points and projection of the desired pattern on the working face can be remotely controlled by use of the wireless control system to improve workability of the marking procedure.

As many apparently widely different embodiments of this invention may be made without departing from the spirit and scope thereof, it is to be understood that the invention is not limited to the specific embodiments thereof except as defined in the appended claims.

What is claimed is:

1. A method for marking design points in a working face in a tunnel by use of a laser positioner comprising a laser surveying unit for effecting distance and angular measurements, a control system for determining the design points based on surveying data of the distances and angular measurements outputted from the laser surveying unit and controlling the laser surveying unit in measuring, and a laser pattern projector for forming a pattern representing the design points on the working face to be marked, said methods comprising:

performing a geological survey and a soil analysis to plan and execute designs so as to determine design data representing the number and locations of points where explosive charging holes are to be bored at different locations along a design route of the tunnel;

locating said laser positioner at a base point;

locating reflector targets at reference points;

operating said laser surveying unit to direct a laser beam to the reflector targets so as to measure the distances and angles of the laser surveying unit relative to the respective targets to obtain absolute coordinates of the working face;

inputting to said control system said design data for determining points at which the desired explosive charging holes are to be bored in the working face and obtaining control signals for operating the laser pattern projector;

inputting the control signals to the laser pattern projector to form a laser pattern indicating concurrently the locations of all the explosive charging holes to be bored in the working face; and carrying out boring work, while projecting the laser pattern to optically mark the design points on the working face, to form the holes for charging the explosives in the working face.

2. An apparatus for use in marking an object face, comprising:
- a reflector target adapted to be positioned relative to the object face;
- a laser surveying means for issuing a first laser beam toward said reflector target and receiving a reflection of said first laser beam from said reflector target to measure distances and angles of said reflector target relative to said laser surveying means, in order to determine surveying data for the object face;
- control means for determining, on the basis of said surveying data determined by said laser surveying means, design points on the object face;
- a laser pattern projector including a laser output means for outputting a second laser beam toward the object face, and a laser deflection means for deflecting said second laser beam; and
- wherein said control means is further operable to control said laser deflection means to continuously deflect said second laser beam in such a manner as to project a pattern representing the design points onto the object face.

3. An apparatus as recited in claim 2, further comprising
- a laser beam generating means for generating a third laser beam to form, on the object face, a single laser spot representing one of the design points.

4. An apparatus as recited in claim 3, wherein
- said laser beam generating means and said laser surveying means together form an operation system; and
- a universal positioning means is provided for selectively positioning said operation system such that said first and third laser beams can be directed in substantially any direction, said universal positioning means including a vertical rotation motor and a horizontal rotation motor operably mounted to said operation system.

5. An apparatus as recited in claim 4, further comprising
- a portable casing within which said operation system is retained.

6. An apparatus as recited in claim 2, further comprising
- a universal positioning means for selectively positioning said laser surveying means to allow said first laser beam to be directed in substantially any direction, said universal positioning means including a vertical rotation motor and a horizontal rotation motor operably mounted to said laser surveying means.

7. An apparatus as recited in claim 2, wherein
- said control means includes an arithmetic control means for determining said design points and setting command signals, and a control console for controlling said laser surveying means and said laser pattern projector in accordance with said command signals and design points from said arithmetic control means.

8. An apparatus as recited in claim 7, wherein
- said arithmetic control means includes a keyboard for inputting design data, a display unit, and a memory unit for storing the design data.

9. An apparatus as recited in claim 2, wherein
- said control means includes a wireless control system having a wireless transmitter hand unit for transmitting control signals and a wireless receiver unit for receiving the control signals from said transmitter hand unit.

10. A method for marking design points on an object face, comprising:
- positioning reflector targets relative to the object face;
- operating a surveying laser unit to issue a first laser beam toward the targets and receive a reflection of said first laser beam from the targets, to measure distances and angles of said targets relative to said surveying laser unit, in order to determine surveying data for the object face;
- determining, on the basis of said surveying data, design points on the object face; and
- operating a laser pattern projector to output a second laser beam toward the object face and continuously deflect said second laser beam in such a manner as to project a pattern representing the design points onto the object face.

11. A method as recited in claim 10, further comprising
- operating a laser beam generator to generate a third laser beam in order to form, on the object face, a single laser spot representing one of the design points.

* * * * *